United States Patent [19]

Rotar

[11] Patent Number: 4,668,143
[45] Date of Patent: May 26, 1987

[54] LOCK NUT FOR AUTOMOBILE STEREO SYSTEMS

[76] Inventor: Lawrence J. Rotar, 3832 - 18th Ave. S., Minneapolis, Minn. 55407

[21] Appl. No.: 645,781

[22] Filed: Aug. 30, 1984

Related U.S. Application Data

[63] Continuation-in-part of Ser. No. 569,186, Jan. 9, 1984, abandoned.

[51] Int. Cl.⁴ .................. F16B 39/28; F16B 41/00
[52] U.S. Cl. .................................. 411/140; 411/429; 411/910; 70/231
[58] Field of Search ............... 411/140, 141, 117, 197, 411/198, 427, 429, 910, 919; 70/229-232, 369

[56] References Cited

U.S. PATENT DOCUMENTS

| | | |
|---|---|---|
| 1,212,033 | 1/1917 | Ensign et al. ............... 411/198 |
| 1,287,270 | 2/1918 | Ensign ........................ 411/198 |
| 1,717,668 | 6/1929 | Dhaenens .................... 411/140 |
| 1,900,098 | 3/1933 | Cooper ........................ 411/429 |
| 3,358,480 | 12/1967 | Leslie . | |
| 3,492,841 | 2/1970 | Ipri ............................. 70/231 |
| 3,766,759 | 10/1973 | Artner . | |
| 3,796,074 | 3/1974 | Vik .............................. 70/231 |
| 3,874,258 | 4/1975 | Semola et al. ............... 411/427 |
| 3,978,698 | 9/1976 | Ono ............................ 70/231 |
| 4,027,508 | 6/1977 | McGourtny . | |
| 4,248,069 | 2/1981 | Burbank . | |
| 4,361,057 | 11/1982 | Kochera ...................... 411/140 |
| 4,521,146 | 6/1985 | Wharton ..................... 411/910 |

FOREIGN PATENT DOCUMENTS 296860 9/1928 United Kingdom ............ 70/231

Primary Examiner—Gary L. Smith
Assistant Examiner—Neill Wilson
Attorney, Agent, or Firm—Merchant, Gould, Smith, Edell, Welter & Schmidt

[57] ABSTRACT

The present invention is directed to a locking device to frustrate unauthorized removal of stereo systems and like assemblies from automobiles or trucks. The device includes a frusto-conically shaped housing with a rotation prevention mechanism fastened therein. A plurality of spaced nubs function to prevent removal of the locking device from the threaded shaft of the electronics unit without a tool having the proper combination of mating openings to receive the nubs.

6 Claims, 8 Drawing Figures

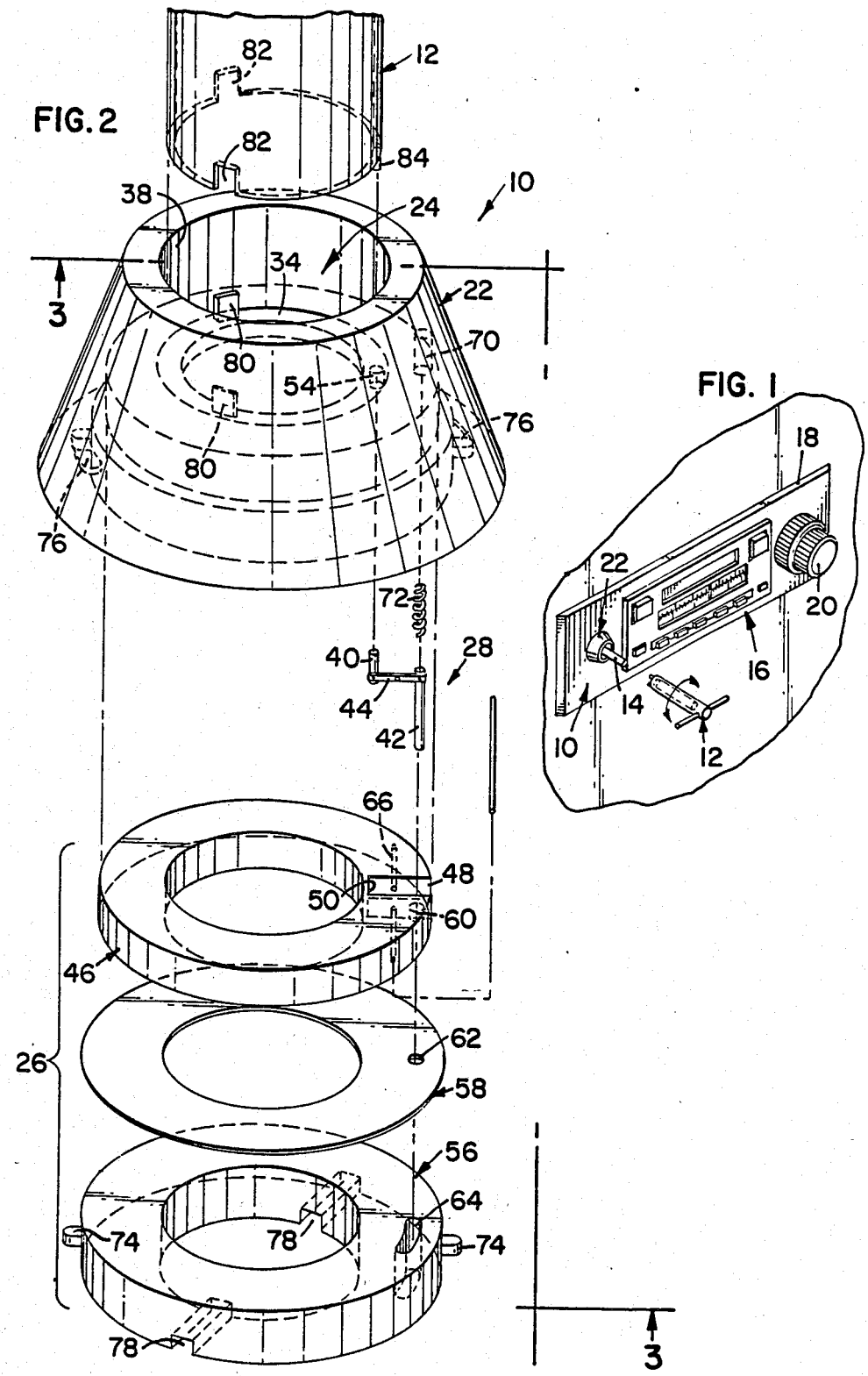

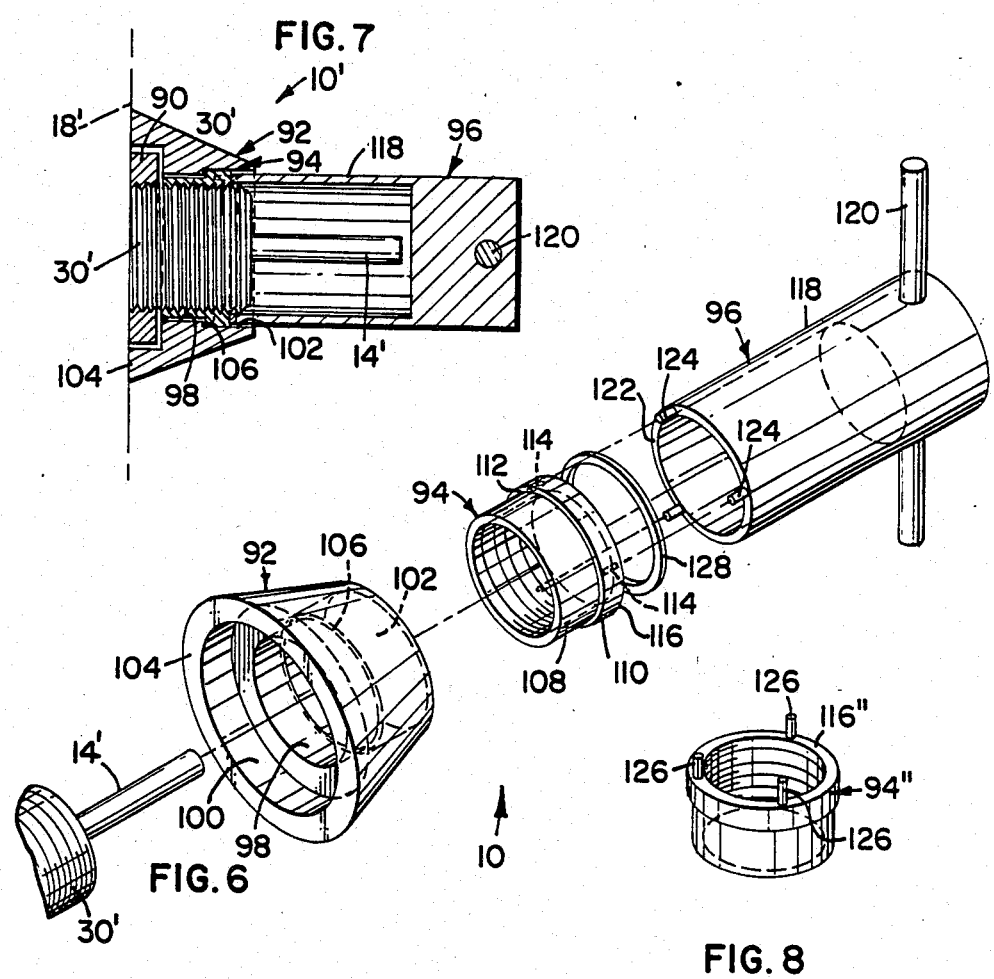

LOCK NUT FOR AUTOMOBILE STEREO SYSTEMS

This is a continuation-in-part application of Ser. No. 569,186, filed Jan. 9, 1984 now abondoned.

TECHNICAL FIELD

The present invention is directed to a locking device for frustrating unauthorized removal of stereo systems and like assemblies from dashplates or other such plates, primarily in relation to automobiles or trucks.

BACKGROUND OF THE INVENTION

Radios, stereo systems and tape decks have become more and more sophisticated to deliver higher quality sound to the listener. Such systems have also become more and more expensive. During the past several years, such systems have become a common target for burglers. The usual car or truck unit is attached at the tuner and volume shafts to a plate attached to the vehicle, oftentimes the dashplate of the vehicle. Commonly, the shafts protrude through openings in the plate and a nut is tightened on a threaded portion of each of the shafts to draw the chassis of the electronics to the rear side of the plate. One or more knobs is fastened with a set screw to the shafts. Once the burgler has obtained entry into the vehicle, it has been a relatively simple task for him to remove the knobs, loosen the nuts, cut or remove any wires attached between the vehicle and the chassis of the electronics, and than remove the electronics.

Many people have recognized the problem of defeating the would-be burgler, but the solutions have been inadequate. For example, U.S. Pat. No. 3,358,480, shows a locking mechanism which fits over the knobs attached to the shafts. The mechanism is comprised of a mounting nut which threads onto each of the shafts of the electronics unit. The mounting nut is screwed to the dashplate. The mounting nut includes a plurality of slots. A cylindrical housing fits over the knob and shaft of the electronics unit and has tangs for fitting into the slots. The housing makes the screws which attach the nut to the dashplate inaccessible. A regular key and lock assembly controls the tangs for installation and removal of the housing to the slotted nut. The problem with the locking mechanism is that the user must always install and remove the housing portion of the mechanism. The key may get lost. The bigger problem, however, is that it is simply too inconvenient for the average user to continually have to worry about installing and removing the housing. U.S. Pat. No. 3,766,759, shows a somewhat different locking device wherein a threaded shaft extends completely through the housing of the electronics unit. The shaft is lockable within the housing to prevent rotation of the shaft. The locking mechanism is apparently accessible only from underneath or behind the electronics unit. The problem with this locking device is that retrofitting an existing electronics unit is next to impossible since appropriate holes must be drilled through the entire unit and a threaded bushing installed. The device appears to be practical only if it is designed into the electronics unit.

SUMMARY OF THE INVENTION

The present invention is directed to a device for locking an electronic assembly to a plate wherein the nut which threads onto each shaft to hold the assembly to the plate engages the plate and may be locked or unlocked only with a special tool. The usual knobs for turning the various shafts fit onto the shafts over the present device in the usual way. The locking device is easily installed and retrofitted to existing electronics units. The device need not be designed into the electronics unit.

Broadly described, the locking device includes a housing with a passage therethrough. The passage has a threaded portion for engaging the cylindrical member or shaft. The housing tightens onto the cylindrical member against one side of the plate in order to snug the electronics assembly against the other side of the plate. The locking device further includes a mechanism attached to the housing for engaging the plate when the housing is tightened against the plate.

More particularly, the present locking device has a frusto-conical housing made of a hardened metal to frustrate grasping by a pliers or wrench. The housing has an axial passage with a portion of the passage wall being threaded. Above and below the threaded portion are radial surfaces extending outwardly to the remainder of the wall of the axial passage. A rotation prevention mechanism fits within the housing. One or more rings serve as a retention plug for the rotation prevention mechanism. The rotation prevention mechanism includes axially-parallel, spaced apart first and second pins. The pins are connected together by a lever. The lever pivots about a pivot pin attached to one of the rings of the retention plug. The first pin fits for movement within a passage extending between the first and second radial surfaces on either side of the threaded portion of the housing. The second pin extends in an opposite direction through a passage in the retention plug. The second pin is extendable beyond the outside surface of the retention plug in order to be received within a cavity in the dashplate thereby preventing rotation of the locking device. The rotation prevention mechanism includes a spring which biases the second pin into engagement with the dashplate.

A further feature of the locking device is provision of one or more protuberances for the radial surface facing away from the dashplate. The locking device is used in conjunction with a tubular tool which fits within the axial passage of the housing while at the same time fitting about the extending shaft of the electronics assembly. The tool has notches which mate with and receive the protuberances of the housing. The tool further has a fixed pin for contacting and depressing the first pin of the rotation prevention mechanism. Depression of the first pin causes the lever to pivot and pull the second pin into the housing against the biasing spring. The housing may then be rotated by rotating the tool whereby the sides of the notches push against the protuberances to accomplish the rotation in either direction.

In an alternate embodiment, a conventional nut is received on each of the threaded shafts extending through the dash plate to snug the electronic assembly against the dash plate. A frusto-conical housing is placed on each shaft such that the housing fits about the indicated nut and against the dash plate. Each housing has a shoulder along the inner surface of the axial passageway which receives the electronics assembly shaft. The shoulder separates lesser and greater diameter portions. The lesser diameter portion is adjacent to the nut. A threaded sleeve is turned onto the shaft. The threaded sleeve has a shoulder which mates with the housing shoulder to hold the housing in place. The threaded sleeve includes a surface facing away from the dash plate which has a plurality of cavities or a plurality of protuberances. A mating tool which fits about the shaft and has mating protuberances for the cavities in the sleeve or mating openings for the protuberances on the sleeve is used to tighten the sleeve against the housing. Although optional, a washer may be fitted about each shaft and pushed against the surface of the sleeve in order to cover the cavities or protuberances to further frustrate inadvertent turning off of the locking device.

The present locking device completely encloses the rotation prevention mechanism. The present locking device frustrates the use of pliers and wrenches. The present locking device requires a special tool. A would-be burgler would have difficulty improvising a tool which would fit about a shaft and yet be received within the axial passage of the housing and which would also have notches to receive the protuberances in order to effectuate the rotation. The present device is small, easily installed and may be made sufficiently inexpensive to be readily available to all those who wish to obtain a measure of security for their radios, stereos, or tape decks.

These advantages and other objects obtained with this invention are further explained hereinafter. A preferred embodiment is shown in the drawings and described in detail. Novel and unobvious features of the invention are pointed out in the claims.

BRIEF DESCRIPTION OF THE DRAWINGS

FIG. 1 is a perspective view of a locking device and tool in accordance with the present invention in relation to an electronics assembly and attachment plate;

FIG. 2 is an exploded, perspective view of the locking device, showing a portion of a tool;

FIG. 6 is a perspective view of an alternate embodiment in accordance with the present invention;

FIG. 7 is a cross-sectional view of the alternate embodiment; and

FIG. 8 is a perspective view of an alternative of the sleeve of the embodiment of FIGS. 6 and 7.

DETAILED DESCRIPTION OF THE PREFERRED EMBODIMENT

Figure 3:
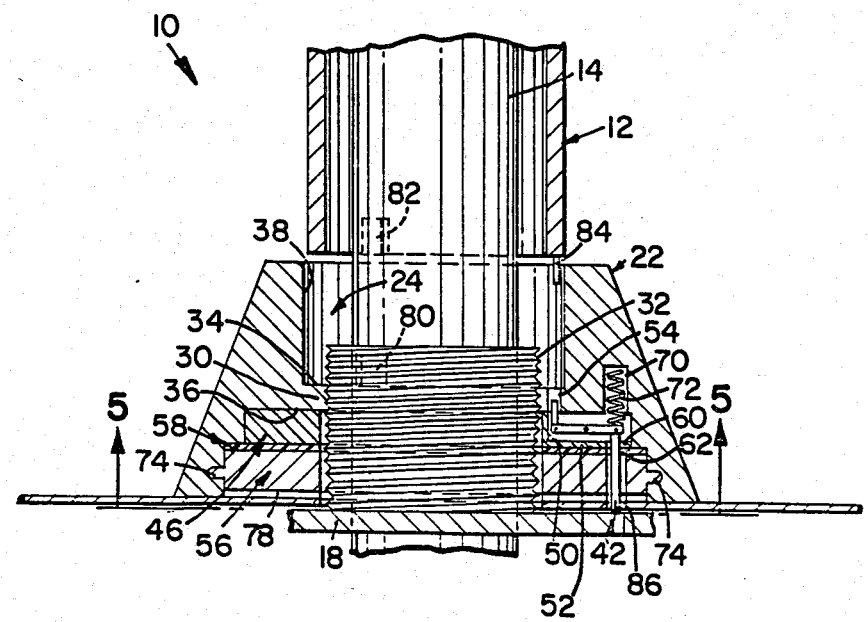
FIG. 3 is a cross-sectional view taken generally along line 3—3 of FIG. 2, showing a portion of the tool.

Referring now to the drawings wherein like reference numerals designate identical or corresponding parts throughout the several views, and more particularly to FIG. 1, a locking device in accordance with the present invention is designated generally by the numeral 10. A tool 12 may be used to screw on or off locking device 10 as explained hereinafter. A locking device 10 on each of the shafts 14 of electronics assembly 16 hold assembly 16 to plate 18. One or more knobs 20 are installed in the usual fashion on a shaft 14 to essentially hide locking device 10.

Locking device 10 includes a housing 22 with an axial passage 24. A set of rings comprise a retaining mechanism 26 for a rotation prevention mechanism 28 contained within housing 22 and retaining mechanism 26.

Housing 22 preferably has a frusto-conical shape. The housing is preferably made from a hardened metal. Stainless steel is an excellent material, although some other hardened metal may be used as well. The conical shape plus the hardened metal surface frustrates grasping of the housing by a pliers or wrench or some other tool trying to operate on the external surface.

Axial passage 24 has a threaded portion (see FIG. 3) for receiving and grasping mating threads on a sleeve 32 about a shaft 14. An upper radial surface 34 extends away from sleeve 32 to define the upper end of threaded portion 30, while a lower radial surface 36 extends away from sleeve 32 to define the lower end of threaded portion 30. Upper cylindrical wall 38 of passage 24 is sufficiently spaced outwardly from the threads of threaded portion 30 to provide space between wall 38 and sleeve 32 for tool 12 and the necessary elements of rotation prevention mechanism 28. Lower radial surface 36 extends farther outwardly than upper radial surface 34. There is more space near the lower end of the conical housing and such additional space is needed for operation of lever 44 of rotation prevention mechanism 28, as explained hereinafter.

Rotation prevention mechanism 28 includes first and second pins, 40, 42. In the preferred embodiment, the pins are substantially parallel to the axis of housing 22. Pins 40 and 42 are connected together in a spaced-apart fashion by lever 44. Lever 44 is connected at its opposite ends to pin 40 and pin 42, respectively.

Figure 4:
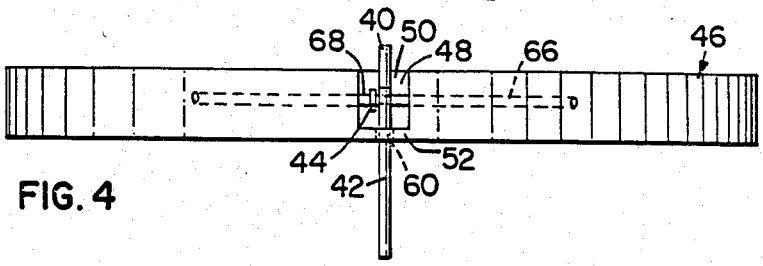
FIG. 4 is a side elevational view of the rotation prevention mechanism as installed in the inner or holding ring.
Figure 5:
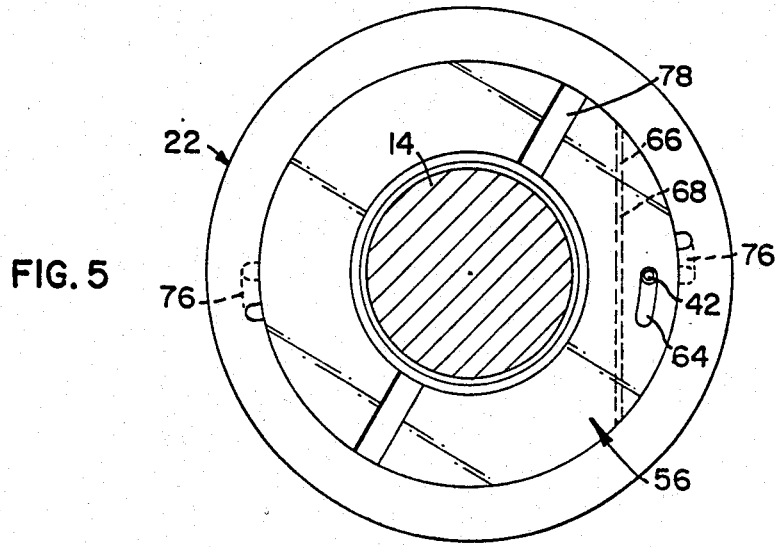
FIG. 5 is a bottom view taken generally along the line 5—5 of FIG. 3 of the locking device, showing a shaft of the electronics assembly in cross section.

Rotation prevention mechanism 28 is attached to inner ring 46 of retaining mechanism 26 as shown in FIG. 4. Ring 46 fits relatively snugly within a mating portion of cavity 24 directly beneath lower radial surface 36. The inner diameter of ring 46 is sufficient to allow the threads of sleeve 32 to pass therethrough. Inner ring 46 includes a cavity 48 in its upper portion. In the preferred embodiment, cavity 48 does not extend completely to the inner diameter of ring 46. Rather, a wall 50 forms the inner end of cavity 48 which then extends radially outwardly to the outer diameter. Also, cavity 48 does not extend completely through ring 46 from side to side, but has a lower wall 52 for a bottom.

With ring 46 in place in housing 22 as shown in FIG. 3, there is located a passage 54 directly above the inner end of cavity 48 and extending between lower and upper radial surfaces 36, 34. Passage 54 receives pin 40. Retaining mechanism 26 (see FIG. 2) is comprised of inner ring 46 and locking ring 56 with a gasket 58 therebetween. Near the outer end of cavity 48 and directly beneath it, there is located a passage 60 through bottom wall 52, an opening 62 through gasket 58 and a slot 64 through locking ring 56. Passage 60, opening 62, and slot 64 are all aligned to receive pin 42.

Rotation prevention mechanism 28 is pivotally attached to inner ring 46. A passage 66 extends centrally between the sides of ring 46 and along a chord of ring 46. A pin 68 passes through passage 66 and an opening in lever 44 to pivotally hold rotation prevention mechanism 28 within cavity 48. Pin 68 must be located so that rotation prevention mechanism 28 can function properly by retracting pin 42 from a mating cavity in dashplate 18 as explained hereinafter.

Inner ring 46 fits within housing 22 adjacent to lower radial surface 36. A cavity 70 directly above pin 42 when it is installed with rotation prevention mechanism 28 and inner ring 46 is formed in housing 22 to receive a coil spring 72. Spring 72 biases pin 42 into an engagement position with plate 18 adjacent to the backside of locking device 10.

With inner ring 46 installed, gasket 58 may be pressed against inner ring 46 such that pin 42 passes through opening 62. Then, locking ring 56 may be installed to retain inner ring 46 and the rotation prevention mechanism held thereto. In the preferred embodiment, locking ring 56 has a pair of tabs extending outwardly from the outer edge of ring 56. Tabs 74 are on opposite sides of ring 56. Housing 22 includes formation of passage 24 at its most rearward end to receive locking ring 56 including a pair of opposing cam slots 76 to receive tabs 74 for axial and circumferential movement. Ring 56 further includes a radial slot 78 in the outermost side for receiving a screwdriver. Ring 56 is pressed into the rearward end of passage 24 so that tabs 74 are received in slots 76. A screwdriver is used to turn ring 56 whereby tabs 74 are cammed into slots 76 to lock rotation prevention mechanism 28, inner ring 46, gasket 58, and locking ring 56 in place. Slot 64 is formed to provide space for pin 42 as outer ring 56 is rotated during installation. It is preferable that pin 40 be positioned at all times beneath upper radial surface 34. In this way, a simple tube could not depress pin 40 thereby retracting pin 42 from engagement with dashplate 18. Even if pin 40 is depressed, however, housing 22 needs to be screwed on or off. Such rotation is difficult or impossible by using a pliers or some other tool on the outside of housing 22. Consequently, one or more nubs or protuberances 80 are provided on upper radial surface 34. Nubs 80 have substantially vertical walls which can be engaged to apply a force to rotate the housing 22. By providing a plurality of nubs at various heights and distances from one another and from passage 54 which receives pin 40, a relatively sophisticated locking combination having a great number of configurations can be devised. The nubs, therefore, serve to hold a cylindrical tool away from pin 40 unless the tool has the correct diameter and wall thickness to fit within passage 24 and between wall 38 and sleeve 32 and unless it also has the correct combination or relationship of slots 82 in one end thereof to receive the various nubs 80. Tool 12 must also have an attached pin 84 at its operational end. Pin 84 is in a proper relationship with respect to slots 82 so that as nubs 80 are received by slots 82 pin 84 is received in passage 54 to depress pin 40 and operate rotation prevention mechanism 28.

In use, the conventional nut which is used to hold an electronics assembly 16 to a plate 18 is removed from sleeve 32. Device 10 is installed in place of the conventional nut. Shaft 14 is received through passage 24. Tool 12 is fitted about shaft 14 such that nubs 80 are received in slots 82 and pin 84 is received within passage 54. Pin 84 depresses pin 40 causing lever 44 to pivot and retract pin 42 within slot 64. The walls of slots 82 then contact the walls of nubs 80 as tool 12 is rotated to thereby screw device 10 onto sleeve 32. Tool 12 must be retracted slightly to determine when pin 42 comes into engagement with a mating detent or cavity in plate 18 when device 10 is relatively tight. Full retraction of tool 12 allows pin 42 to be biased into the detent 86 to lock device 10 in place and prevent further rotation. Knobs 20 may then be installed in the usual fashion.

Electronics assembly 16 may be removed by reversing the steps of installation. It is apparent, however, that removal is substantially frustrated unless one has the proper tool 12 for the particular combination of heights and spacings for nubs 80 and pin 84.

In an alternate embodiment as shown in FIGS. 6-8, equivalent parts are designated by the same numerals as used for the preferred embodiment, but the numerals are primed. Locking device 10' is shown relative to the front surface of a plate 18' with a shaft 14' of an electronics assembly (not shown) protruding therethrough. The electronics assembly is held in place with a conventional nut 90. A frusto-conical housing 92 of a material and outer shape as discussed hereinbefore is fitted about shaft 14' and over nut 90 so as to be adjacent to plate 18'. Housing 92 is held in place by a sleeve 94. Sleeve 94 is threaded and is turned on shaft 14' by a special tool 96.

Housing 92 has an axial passageway with a smaller diameter portion 98 between outer diameter portions 100 and 102 at the ends. Portion 100 at the base end 104 of housing 92 has sufficient diameter and sufficient depth to fit about nut 90 and allow the base end 104 of housing 92 to be placed adjacent to the outer surface of plate 18'. Mid-portion 98 and end portion 102 are separated by a first shoulder 106, the significance of which will become apparent in the discussion hereinafter.

Sleeve 94 is threaded so as to receive threaded portion 30'. The outer surface of sleeve 94 has a lesser diameter portion 108 for fitting within lesser diameter mid-portion 98 of housing 92 and has a greater diameter portion 110 for fitting within the greater diameter end portion 102 of housing 92. Portions 108 and 110 are separated by a second shoulder 112. When sleeve 94 is threaded onto threaded portion 30' of shaft 14', second shoulder 112 engages first shoulder 106 to hold housing 92 in place about shaft 14'. Sleeve 94 includes a plurality of openings 114 at random spacings in a surface 116 facing away from plate 18'. The function of openings 114 is apparent as discussed hereinafter.

Tool 96 is a cylindrical tube 118 with a handle 120 extending transversely therefrom near an end removed from device 10'. Tube 118 has diameter so as to fit about threaded portion 30' of shaft 14' with wall thickness so as to fit within larger diameter portion 102 of housing 92. End 122 opposite handle 120 includes a plurality of protuberances 124 sized and spaced so as to fit within openings 114 of sleeve 94. Alternatively, as shown in FIG. 8, a sleeve designated as 94" may include a plurality of protuberances 126 in surface 116". In such a circumstance, a tool (not shown) similar to 96 would have a plurality of openings for receiving or mating with protuberances 126.

A washer or ring 128 is optional and may be installed to fit against surface 116 of sleeve 94 when sleeve 94 has been tightened against housing 92 with tool 96. Washer 128 functions to cover surface 116 and further frustrate use of an improvised tool to turn off sleeve 94 so as to defeat locking device 10'.

The use of embodiment 10' is similar to the use of the preferred embodiment. Electronics assembly is installed with shafts 14' protruding through plate 18'. Conventional nuts 90 are turned on threaded portion 30' to snug the electronics assembly against plate 18'. A housing 92 is placed over each shaft 14'. A sleeve 94 is then turned on threaded portion 30' of each shaft and tightened with a tool 96. A mating protuberances 124 or openings (not shown) of tool 96 engage cavities 114 or protuberances 126 to allow tool 96 to turn sleeve 94. With sleeve 94 tightened, washer 128 may be placed adjacent to surface 116 to cover the openings or protuberances of sleeve 94. A conventional knob is then installed on shaft 14'. The locking device is disassembled by reversing the steps just described.

Although details of structure and function for the preferred embodiment have been set forth, it is understood that the disclosure is exemplary. Changes in structure may be made which are undoubtedly within the principle of the invention as expressed by the claims. For example, a pair of concentric pins which are spring loaded and function in conjunction with or without a camming surface may operate to provide a rotation prevention mechanism. That is, depression of one pin may cause the other pin to retract axially within the first pin. Such mechanism may be loaded in the retaining mechanism and housing of device 10. As a further example of possible alternate embodiments, pin 40 may extend above radial surface 34. It is conceivable that retaining mechanism 26 now comprised of a pair of rings and a gasket may be replaced by a single ring or may even be eliminated in favor of a plug which would hold and attach rotation prevention mechanism 28 to housing 22. Consequently, it is apparent that changes made, especially changes in matters of shape, size, and arrangement to the full extent extended by the general meaning of the terms in which the appended claims are expressed, are within the principle of the present invention.

What is claimed is:

1. A combination for locking an assembly to and unlocking said assembly from a plate, said assembly having a threaded, cylindrical member extending through an opening in said plate, said combination comprising:

a frusto-conical housing having an axial passage, said passage having a threaded portion for screwing onto said cylindrical member to tighten said assembly to said plate;

means for preventing said housing from unscrewing from said cylindrical member; and tool means for neutralizing said preventing means and screwing or unscrewing said housing with respect to said cylindrical member;

said preventing means including means connected to said housing for engaging said plate, said preventing means further including means for controlling said engaging means and means for selectively receiving tool means with which to operate said control means while simultaneously being capable to screw said housing, said controlling means including a reciprocal pin located near said cylindrical member wherein said tool means includes a tubular member for fitting between said cylindrical member and a wall of said passage, said receiving means including a nub spaced from said pin, said tubular member having a notch along a bottom edge to fit over said nub allowing said cylindrical member to contact said pin to disengage said engaging means and to screw said housing by turning said cylindrical member.

2. The combination in accordance with claim 1 wherein the wall of the passage in said housing includes a step with a radial surface, said pin being located beneath said radial surface, said tubular member having a finger for reaching beneath said radial surface to contact said pin.

3. The combination in accordance with claim 2 including means for biasing said engaging means into engagement with said plate.

4. A device for locking an electronics assembly to and unlocking said electronics assembly from a dashplate, said electronics assembly having a threaded cylinder extending through an opening in said dashplate, said device comprising:

a frusto-conical metallic housing having an axial first passage, said first passage having a threaded portion for screwing onto said cylindrical member to tighten said electronics assembly to said dashplate, said first passage having an axially concentric wall with first and second spaced apart radial surfaces extending between said wall to said threaded portion;

means for preventing said housing from unscrewing from said cylindrical member;

means for retaining said preventing means to said housing;

said preventing means including first and second axially-parallel pins and a substantially radial lever for connecting said pins together, said preventing means further including means for pivotally connecting said lever to said retaining means, said housing including an axially-parallel second passage between said first and second radial surfaces for receiving said first pin, said retaining means including an axially-parallel, third passage for receiving said second pin; and means for biasing said second pin through said third passage toward said dashplate;

whereby when said housing is screwed onto said threaded cylinder, said second pin is biased toward said dashplate to prevent subsequent unscrewing of said housing.

5. The device of claim 4 including a plurality of spaced-apart nubs rising above said first radial surface requiring a tubular tool for installation or renewal, said tool having notches appropriately spaced to receive said nubs and to apply loosening or tightening torque, said tool also having means to function said preventing means.

6. A device in conjunction with a special tool for locking an electronic assembly to and unlocking said electronic assembly from a dashplate, said electronics assembly having a threaded, nonrotatable cylinder encircling a rotatable shaft extending through an opening in said dashplate, a nut for mating with said threaded, nonrotatable cylinder for holding said electronics assembly to said dashplate, and a knob detachably attached to said shaft for rotating said shaft, said device comprising:

a frusto-conical metallic housing having an axial first passage for receiving said nonrotatable cylinder and allowing said shaft to project through said passage for engagement with said knob, said first passage having a first wall and a first shoulder in said first wall, said housing fitting about said nut; and a threaded sleeve for engaging said threaded nonrotatable cylinder between said nut and said knob, said sleeve fitting within said first passage, said sleeve having a second shoulder for mating with said first shoulder of said housing to lock said housing between said dashplate and said knob, said sleeve including a surface facing away from said dashplate, said sleeve further having one of a primary cavity and a primary protruding element in said surface for engagement by said special tool having the other of a mating protruding element for said primary cavity and a mating cavity for said primary protruding element, whereby said tool engages said sleeve to tighten said sleeve and to loosen said sleeve as desired to frustrate undesired removal of said electronics assembly from said dashplate.

* * * * *